United States Patent [19]

Mathauser

[11] Patent Number: 4,615,415
[45] Date of Patent: Oct. 7, 1986

[54] HAND OPERATED HYDRAULIC BICYCLE BRAKE

[76] Inventor: William R. Mathauser, 3000 "B" Ave., Anacortes, Wash. 98221

[21] Appl. No.: 737,207

[22] Filed: May 23, 1985

Related U.S. Application Data

[63] Continuation of Ser. No. 478,079, Mar. 23, 1983, abandoned.

[51] Int. Cl.[4] .............................................. B62L 1/10
[52] U.S. Cl. .................... 188/24.22; 188/344
[58] Field of Search ............... 188/24.11, 24.12, 24.14, 188/24.15, 24.16, 24.19, 24.22, 26, 72.4, 72.5, 72.6, 344, 345, 364; 74/18.2; 92/98 D; 267/64.21, 64.24, 122, 123; 277/88, 212 FB; 403/50, 51

[56] References Cited

U.S. PATENT DOCUMENTS

| | | | |
|---|---|---|---|
| 3,292,957 | 12/1966 | Ulderup | 277/212 FB |
| 3,748,913 | 7/1973 | Quiney | 74/18.2 X |
| 3,776,333 | 12/1973 | Mathauser | 188/24.19 X |
| 3,899,057 | 8/1975 | Carre | 188/344 X |
| 3,935,927 | 2/1976 | Haraikawa | 188/26 X |
| 4,175,648 | 11/1979 | Sule | 188/344 |
| 4,391,353 | 7/1983 | Mathauser | 188/24.12 |

FOREIGN PATENT DOCUMENTS

| | | | |
|---|---|---|---|
| 518408 | 11/1955 | Canada | 188/344 |
| 1114275 | 9/1961 | Fed. Rep. of Germany | 92/98 D |
| 1031172 | 6/1953 | France | 74/18.2 |
| 52-52077 | 4/1977 | Japan | 188/344 |
| 309011 | 4/1929 | United Kingdom | 74/18.2 |

*Primary Examiner*—Bruce H. Stoner, Jr.
*Assistant Examiner*—Richard R. Diefendorf
*Attorney, Agent, or Firm*—Shoemaker and Mattare, Ltd.

[57] ABSTRACT

A hand operated hydraulic bicycle brake includes a brake pad holding unit which is actuated by a rolling diaphragm. A flexible fluid line couples a master cylinder located on the handlebars of the bicycle to the rolling diaphragm which controls a slave cylinder located adjacent to the rim of the front wheel of the bicycle. Actuation of the slave cylinder forces the brake pad into contact with the rim, and further actuation of the master cylinder causes the unit to pivot to bring a second brake pad into contact with the wheel rim.

14 Claims, 7 Drawing Figures

HAND OPERATED HYDRAULIC BICYCLE BRAKE

This is a continuation of application Ser. No. 478,079, filed Mar. 23, 1983, now abandoned.

BACKGROUND OF THE INVENTION

The present invention relates in general to brakes for land vehicles, and, more particularly, to bicycle brakes.

There are several drawbacks inherent with those brakes presently used with bicycles. Among these drawbacks are the following.

Most of the presently known hydraulic bicycle brakes utilize two cylinders. The use of two cylinders causes several problems. First, a considerable amount of weight is added by the presence of an extra cylinder. Two cylinders generally encumber the brake unit and make it vulnerable to damage due to the far-reaching appendage of the unit. Such vulnerability merely doubles maintenance problems and initial costs involved with such units. Size and weight, both being major factors in bicycles, are important considerations detrimentally affected by the use of two cylinders. A large master cylinder is required to supply both of the slave cylinders, and thus the size and weight of such units is increased as compared to a unit using only a single slave cylinder.

It is noted that in reality, there are no hydraulic bicycle brakes available today on the market. The Shimano brake has a reservoir system similar to that in an automobile, and it occasionally, especially when the bike is roughly handled or tipped over, has air in the system. This happens quite often, and requires proper bleeding and servicing. In order to perform this service, a man has to be a hydraulic expert. This presents a problem to install the sufficient number of repair stations to service the brake. Also, the brake has not shown good acceptance because of its very heavy and clumsy appearance.

Many presently known bicycle brake units include factory sealed systems. Such systems present still further drawbacks. For example, on brake units with factory sealed systems, no field or owner maintenance can be performed.

U.S. Pat. No. 3,776,333 discloses a brake with a sealed system. Where this device does not have the servicing problems that the Shimano device had, it has other disadvantages. In actual service, it was found that a system that was indeed sealed had to be replaced in its entirety if any damage occurred within the system, such as a broken line, leak, or the like. Secondly, it was found that within the system, any flexible portion thereof, such as the flexible hydraulic line itself, has one inherent characteristic. Any flexible material that is carrying fluid under pressure constantly has a tendency to bleed and have permeability. In time, depending on pressure and temperature, the brakes lose their effectiveness and may become quite dangerous. There is no known way of coping with this condition. Also, this requires dealers to carry a series of different lengths of hydraulic lines to accommodate various sizes of bicycles. Another disadvantage of the device disclosed in this patent is the cost and limited life of the bellows. There is a definite limit of travel in the bellows, and if this is extended, overstressing of the bellows and an extremely short life will result.

One presently known brake unit is disclosed in U.S. Pat. No. 3,935,927. However, the device disclosed in this patent has several drawbacks. First, the system disclosed in this patent is virtually a fixed system in that it allows for no adjustment other than horizontal. The patented system is inherently very heavy, and therefore is not a practical brake for bicycles. It is here noted that with the exception of heavy tandem-type machines where two, three or four people are riding on them, use of a disc-type brake is not possible. Such heavy machines use heavy wheels and heavy spokes to allow the forces from a disc mounted at the hub to be transferred to the outer periphery of the wheel. When a disc is mounted as just mentioned on a conventional bicycle, and an effort is made to stop the bicycle from the center of the wheel, such as in the patented disc brake, it subjects the nipples, the spokes and the rim to pressures and forces that these elements are not designed to withstand if the weight of the bicycle is to be kept within practical limits. It is here noted that the heaviest drag on a bicycle is that of the periphery of the wheel and the outer extremities of the wheel. Tires, rims, and spokes and the like should, therefore, be as light as possible. As braking forces are applied closer to the outer periphery of a wheel, these forces become more effective and less pressure is required. Thus, the forces necessary to stop a wheel in the center as disclosed in the just-referenced patent far exceed such forces as applied at the outer circumference of that same wheel. In order to induce such stopping forces in the patented device, a considerable amount of weight in material alone is required. In motorcycles, where weight is not an important criteria, the patented brake may be practical, as in nearly all cases, the brake is actuated by a rider's foot, and ample leverage and pressure can be generated. However, in a hand brake, since there is so little energy or forces which can be generated by a rider's hand, it is imperative that as little loss as possible occur between the hand pressures and the pressures generated at the brake pad.

A further prior art brake system is known as the Shimano-type brake system. The Shimano system is a reservoir-type hydraulic system. This, on a bicycle, has proven to be undesirable. It uses a wet cylinder similar to that in a car and, of course, a certain amount of dripping and bleeding is always prevalent. Secondly, with a so-called "open-system", any air entrapment in the system, from the bicycle tipping over, or the like, causes difficult problems. The brake is no longer being manufactured because of this vulnerability to ingesting air into the system.

Furthermore, presently known bicycle braking devices are difficult and expensive to manufacture. Often it takes as much as 30 minutes line time to assemble such devices. This lengthy assembly time is caused because appendages or cables are positioned and welded on various positions of the frame. Other brackets and fittings are also painstakingly welded to the frame and the cable is carefully put through small eyelets and leads. The brake is finally installed in its proper position. The cables are then adjusted, tightened and cut, and the brake aligned and adjusted in its final form. There seems to be no quick way of executing the above steps.

Yet a further disadvantage to known brakes results because of the gripping requirements of hand operated brakes. In all mechanical, cable brakes marketed and in use today, in order to get sufficient braking force and to compensate for friction within the system, the lever handle, or arm, must have within its design as much lever action as practical. Usually a 5 or 6 to 1 leverage ratio is all that can be designed into this type of system.

The Campagnolo brake, for example, has a distance of 2½ inches between the handlebar and the back of the lever handle. If one has a large hand, and is capable of pulling the brake, one can get adequate stopping conditions. However, small-handed children and women do not have that reach or that power to properly stop the bicycle. This means that in order to brake a bicycle, especially if it is loaded, the small-handed person must reach out and simply pull the handle itself. This is not a squeezing action and is very dangerous to do, but is simply the only way such a person can stop the bicycle. Squeezing between the thumb and forefinger is the only practical way of controlling the forces.

With regard to present brake systems, it is noted that automobiles and motorcycles or other heavy equipment can use rolling diaphragms in the brake systems thereof. However, due to special considerations involved with bicycle brakes, no such elements have been included in these bicycle brakes. Thus, bicycle brakes suffer severe limitations in tolerance of wheel misalignment, chatter, brake misalignment, and the like. Furthermore, the hand actuating units for known bicycle brakes are not at all amenable to use by young children, women, or other riders having small hands or weak grips.

A still further problem with known bicycle brakes is the reduction in braking force due to misalignment or the like.

Still further, at present, with the exception of large diaphragms that are attached in the middle by through bolting, the only other way of securing a piston and a head is through mastic. This is not practical and is virtually unacceptable on most rolling diaphragm materials because the elastomer and other bonding agents, in time, free from one another. Although the condition may not be a problem with rolling diaphragms in heavy equipment applications it becomes a severe problem if it occurs in a bicycle brake. The staccato, or severe, excessive vibrations that occur in a bicycle create problems. Since a bicycle normally has very hard tires, has no shock absorbers, nor any spring relief from road or ground irregularities, the loads and shocks are amplified and transferred into the frame and other components, and severely shake up the operator and the vehicle. When a rolling diaphragm unit is extended or applied, the sloshing of hydraulic fluid can force the rolling diaphragm out of the desired configuration. When the piston re-enters the rolling diaphragm, jamming can easily occur and the folds that should flow around the piston simply do not exist, and ripping and tearing of the diaphragm can occur.

SUMMARY OF THE INVENTION

The hydraulic bicycle brake embodying the teachings of the present invention includes a brake pad unit which has a single slave cylinder fluidly connected to a hand actuated master cylinder by a flexible fluid line. The flexible line is releasably coupled to a hydraulic cylinder actuator which moves a brake pad holder.

A second brake pad holder is mounted on the brake pad unit to be immovable with respect to that unit.

The pads are oriented so that braking generated forces are taken directly in the outer of the two brake pad holder arms, thereby eliminating substantially all twisting of those arms.

Only one cylinder is used, and thus the drawbacks discussed above with regard to dual cylinder units are overcome. The flexibility of the hydraulic line used in the device disclosed herein permits such mounting position to be assumed by the unit, whereas cable systems will not permit such mounting.

The flexible hydraulic line is detachably connected to the brake pad holder unit so that the brake unit can be easily serviced in the field or by a bicycle shop.

A rolling diaphragm is used in the device disclosed herein. This rolling diaphragm has one end thereof which evaginates during the actuation step as opposed to an accordian-like folding and unfolding of a bellows. A bellows, be it metal or synthetic material, has a very short lifetime and a limited degree of travel as compared to the rolling diaphragm used herein. Furthermore, the rolling diaphragm is less expensive to manufacture than a bellows.

It is here noted that there are many problems in using a rolling diaphragm in a bicycle brake. Principal among these problems is the size and weight considerations inherent in bicycles. Thus, some of the unique design parameters of the rolling diaphragm of the present invention are: (1) the diaphragm height to cylinder bore ratio exceeds normal limits for the stroke and pressure requirements; (2) a retention means on the flange of the diaphragm seals high pressure, yet keeps the hardware envelope small; (3) special elastomer/fabric considerations minimize permeability and axial elongation under differential pressure; (4) the diaphragm has a special bead and a very special height to bore ratio of 1.36:1, the significance of which can best be illustrated by comparing this ratio to the normal technology, which permits heights of only 1:1.

By securing the piston and rolling diaphragm into an integral unit, and through the use of an extra bead or securing ridge, the above-mentioned jamming and slippage can be eliminated.

The rolling diaphragm can be roughly a round member, or the configuration can be tapered, as suitable.

In the brake disclosed herein, there is only 1½ inches between the lever and the handle. Also, because of the lack of friction in the system and the hydraulic advantage between the dissimilar sizes of the master cylinder and the slave cylinder, riders can even ride "on top of the bars" and can generate sufficient force to adequately stop the bicycle. Most people do, indeed, ride with the hands on top of the bars rather than in the "drop" because it is far more comfortable than the so-called "racing" or "on-the-drop" position. The above-discussed disadvantages to small-handed people are thus overcome by the presently disclosed brake.

OBJECTS OF THE INVENTION

It is the main object of the present invention to provide a hand actuated hydraulic bicycle brake actuator unit which can be used by all rider's, even those with weak grips or small hands.

It is another object of the present invention to provide an easily and efficiently manufactured hand actuated hydraulic brake for a bicycle.

It is still another object of the present invention to provide a hand actuated hydraulic bicycle brake which is easily serviced.

It is a further object of the present invention to provide a hand actuated hydraulic bicycle brake having only one slave cylinder.

These together with other objects and advantages which will become subsequently apparent reside in the details of construction and operation as more fully hereinafter described and claimed, reference being had to the accompanying drawings forming part hereof, wherein like reference numerals refer to like parts throughout.

DETAILED DESCRIPTION OF THE INVENTION

Figure 1:
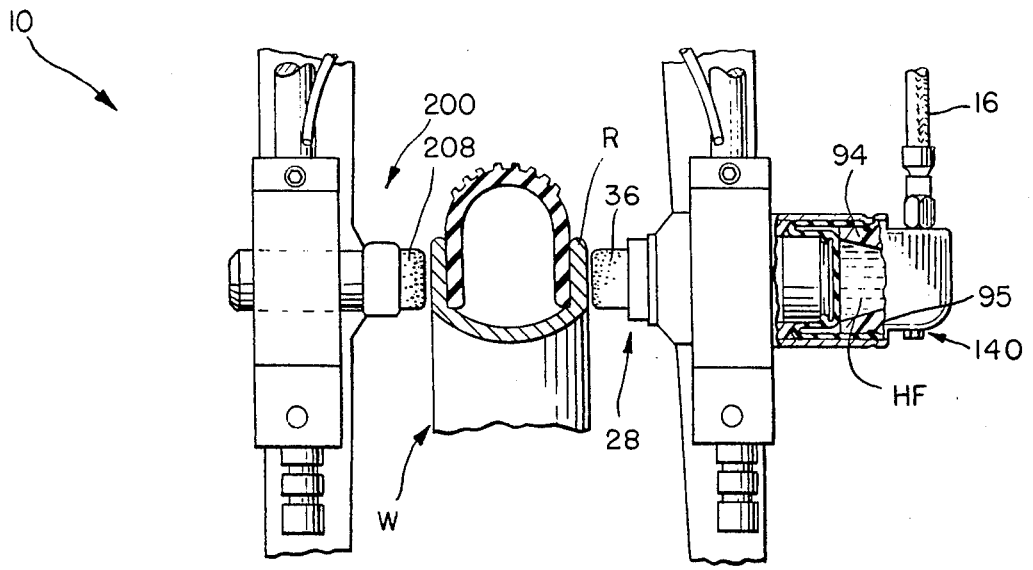
FIG. 1 is a partially cut away elevation view of a brake unit embodying the teachings of the present invention.

Shown in FIG. 1 is a brake unit 10 embodying the teachings of the present invention. The unit 10 is mounted on a wheel W of a bicycle, and includes a pair of hand actuators mounted on the handlebars of the bicycle by suitable mounting means. A flexible hydraulic line 16 is connected to the hand actuator. The flexibility of the line 16 permits the brake unit to be properly positioned.

The hand actuator includes a master cylinder and an actuating lever pivotally mounted on a mounting bracket by a pivot pin. The mounting bracket is mounted on the handlebars by a mounting means. Actuation of the lever forces hydraulic fluid from the master cylinder into the brake unit 10 via the flexible hydraulic line 16. Return movements of elements in the brake unit forces the hydraulic fluid back into the master cylinder via the hydraulic line 16.

The brake unit includes a movable brake arm 28 which includes a brake pad holder.

The details of the brake unit, as well as the details of the brake pad holder, are fully disclosed in a co-pending patent application, Ser. No. 227,925, filed on Jan. 23, 1981 by the present inventor now U.S. Pat. No. 4,391,353. The disclosure of Ser. No. 227,925 is fully incorporated herein by reference thereto, and thus, the brake unit 10 will be discussed herein only in broad terms. The details can be obtained from the just-referenced patent application.

Figure 2:
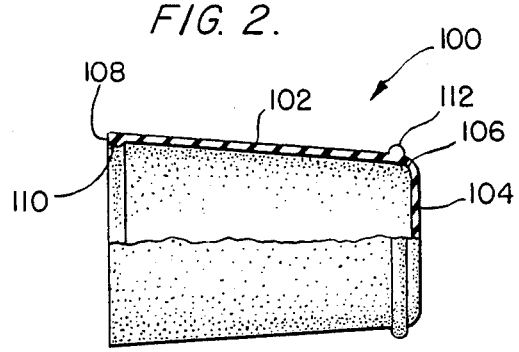
FIG. 2 is an elevation view, partially cut away, of a rolling diaphragm embodying the teachings of the present invention.
Figure 3:
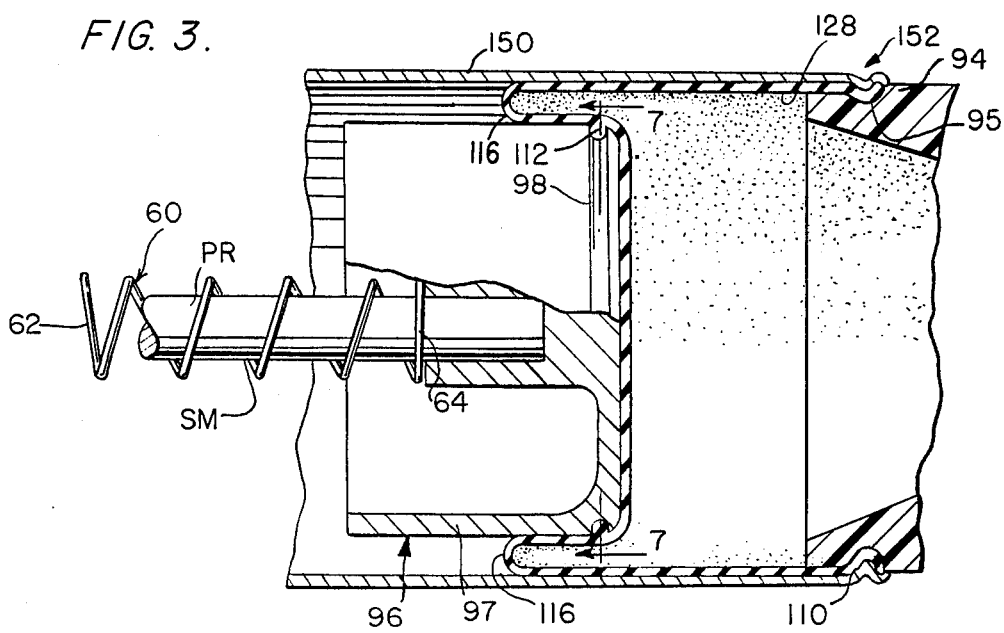
FIG. 3 is an elevation view of the rolling diaphragm of the present invention in a brake unit.
Figure 4:
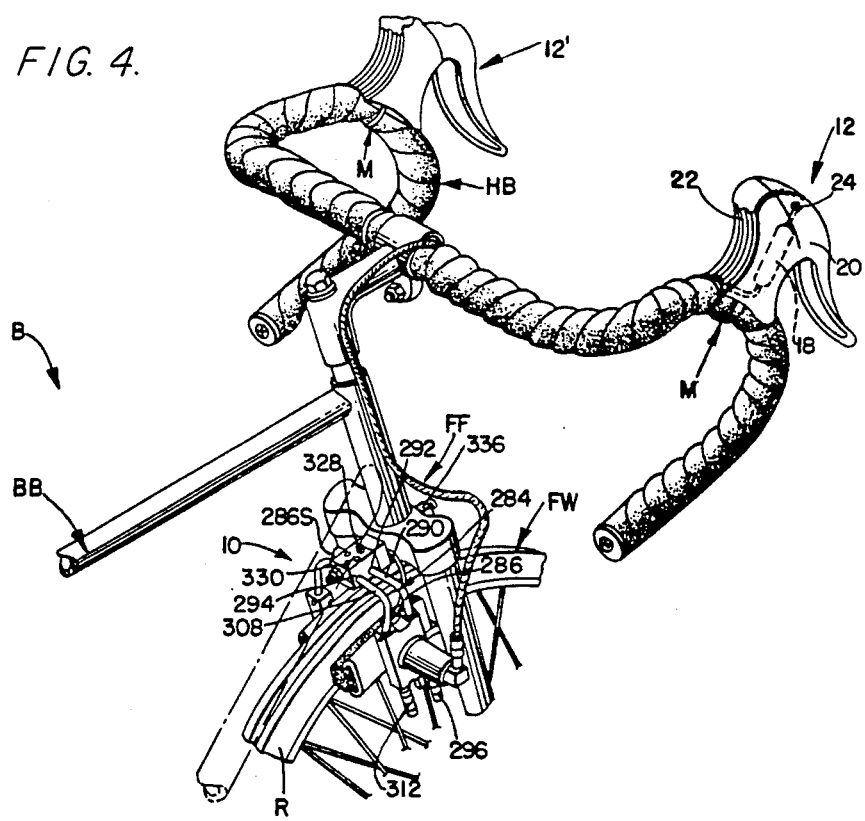
FIG. 4 is a perspective of a front of a bicycle having mounted thereon a brake unit embodying the teachings of the present invention.
Figure 5:
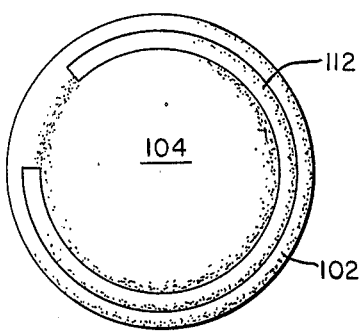
FIG. 5 is an end view looking from the right of FIG. 2.
Figure 6:
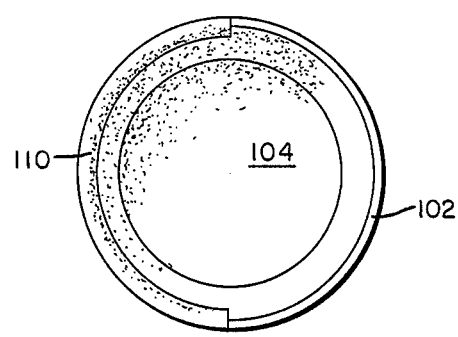
FIG. 6 is another end view looking from the left of FIG. 2.
Figure 7:
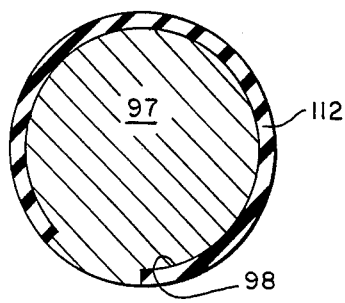
FIG. 7 is a view taken generally along line 7—7 of FIG. 3.

The rolling diaphragm is best shown in FIGS. 2 and 3, and attention is directed thereto for the following discussion.

A cylinder actuating piston includes a lug 94 having a circumferential groove 95 defined therein adjacent to one end thereof. The lug 94 and groove 95 correspond to those elements disclosed and discussed in the referenced patent application. Thus, no further discussion will be presented here. The unit further includes a piston 96 having a head 97 and a piston rod PR attached thereto. The head 97 has a groove 98 defined in the outer surface thereof to be circumambient that head adjacent to one end thereof. The groove is arcuate in transverse cross-sectional shape and encompasses a major portion of 360° so that only a small arc length portion is open. The open section is less than 180° and can be, for example, on the order of 40°–45°. The function and purpose of this groove and reduced opening will be apparent from the ensuing discussion. The piston also includes a piston rod coupled to the brake pad mounting unit. As shown in FIG. 3, a spring, corresponding to spring 62 of the referenced patent application, can surround the piston rod for the purpose outlined in that patent application.

The rolling diaphragm is designated in FIGS. 2 and 3 by the reference numeral 100 and includes a cylindrical wall 102, a base 104 and a knee section 106 connecting the wall to the base. The diaphragm has a rim portion 108 and tapers from one diameter at the rim portion to a smaller diameter at the base. However, the diaphragm need not taper, if suitable. The diaphragm is hollow and further includes a first sealing bead 110 on the inner surface of the diaphragm adjacent to the rim portion and a second sealing bead 112 on the outer surface of the diaphragm adjacent to the knee section.

The sealing beads 112 and 110 are received in grooves 98 on the piston head and 95 on the lug 94, respectively, as best shown in FIG. 3. Thus, the beads are shaped correspondingly with bead 112 having an outer circumferential extent of greater than 180°, and as much as 315°, while bead 110 has an outer circumference extending for approximately 180°, or the like. Bead 112 thus snaps into groove 98 and is securely retained therein even though the brake unit is subjected to severe vibrations or the diaphragm is overextended.

As shown in FIG. 3, the bead 110 is trapped in groove 95 by the outer housing sleeve 150 which has the discontinuity defined by the crimp and end 152 located to force the bead 110 into the groove 95.

As best shown in FIG. 3, the rolling diaphragm evaginates when it is attached to the housing and lug 94 as well as to the piston head. Thus, the wall section of the diaphragm defines a reverse bend portion 116 which moves as the diaphragm extends or contracts.

It is also noted that the bead 112 can be serrated or have another such roughened surface or be cast in sections, as required. A barb-like design for the bead 112 can also be used if suitable. Once in place, the bead 112 is held securely in the groove.

The sealing beads are cast out of the rolling diaphragm elastomer material when the rolling diaphragm is manufactured.

The additional securing feature provided by the bead 112 prevents piston-diaphragm separation should the diaphragm become hyperextended for some reason.

The lug 94 has a fluid chamber defined therein and a fluid passage fluidly connecting a fluid fitting receiving bore (not shown) with the lug chamber. The fluid chamber is in fluid communication with inner bore 128 of the rolling diaphragm 98. Hydraulic fluid HF (FIG. 1) is located in the chamber and in the rolling diaphragm. A fitting fluidly detachably connects the hydraulic line 16 to the fluid passage so fluid from the diaphragm and the chamber can move into and out of those chambers.

A drain 140 is fluidly connected to the passage and includes a drain screw to control the amount of hydraulic fluid in the system.

The brake unit further includes a stationary brake arm 200, best shown in FIG. 1. It is noted that the brake arm 200 is not really stationary, but is stationary with respect to the mounting frame. Thus, the terms "fixed", "stationary" or the like, when used with respect to the arm 200, are intended to mean fixed with respect to the brake unit and not with respect to the bicycle wheel. The stationary arm 200 includes a brake pad holder mounting.

Both brake arms 28 and 200 are mounted on the wheel W by a mounting frame which is fully discussed in the referenced patent application.

Upon actuation of the hand actuator, hydraulic fluid is forced from the master cylinder into the actuator, or slave, via the fluid path which includes flexible tube 16, and the fitting. The rolling diaphragm expands from the FIG. 3 position under the influence of the incoming hydraulic fluid.

The expansion of this diaphragm forces the brake pad 36 toward the bicycle wheel, and ultimately the brake pad contacts wheel rim R, and, as the wheel and brake arm are fixed, will stop any further inward movement of the brake pad.

The brake arm 200 is stationary with respect to the corresponding bracket arm, and in order to complete the braking action, as more hydraulic fluid is forced into the rolling diaphragm, the entire unit must pivot around the wheels and about an axis which is essentially perpendicular to the axis of rotation of that wheel. A further influx of hydraulic fluid into the rolling diaphragm after the brake pad 36 contacts the rim of the wheel can only be compensated for by the pivoting action of the brake unit. The tilting of the unit 10 forces the bracket arm inwardly toward the wheel, and hence inwardly toward the brake arm 28.

Ultimately, after a predetermined amount of pivoting action by the brake unit has occurred, the brake pad 208 is forced against the wheel rim R thereby capturing the wheel rim in a braking action between the two brake pads 36 and 208 and further actuation of the master cylinder completes the braking movement.

Release of the brake pad 36 from the bicycle wheel permits a biasing spring to force the brake arm 200 away from the wheel by twisting the unit 10 about a main bolt.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A hand actuated hydraulic brake for a bicycle comprising:
a brake pad holder unit mounted on the bicycle, said brake pad holder unit including first and second bicycle brake housings mounted on a bracket arm to be on opposite sides of a bicycle wheel, said housing each being of a size commonly found on a bicycle, a lug mounted on said first housing, said lug having a lug groove defined therein, a fluid actuated bracket arm moving means connected to said first housing and a first brake pad connected to said second housing, said bracket arm moving means including a rolling diaphragm fluidly connected to a master cylinder by a flexible fluid line via said lug to exchange hydraulic fluid therewith, a movable brake pad holder connected to a piston rod, said piston rod including a piston head having a circumferential groove defined therein and being slidably mounted in said first housing and engaged with said rolling diaphragm for movement therewith, said rolling diaphragm including a base contacting said piston head, a side portion adjacent to said first housing and a reverse bend connecting portion connecting said diaphragm base and side portion so that said rolling diaphragm can fold upon itself within said first bicycle brake housing, said rolling diaphragm having sufficient flexibility to operate efficiently in a bicycle hydraulic brake unit, a piston rod return means engaged against said piston head to bias said diaphragm against action of hydraulic fluid forced thereinto by said master cylinder, and a second brake pad mounted on said movable brake pad holder, and said diaphragm including a first bead on the inner surface thereof which engages said lug groove to attach said diaphragm to said lug and a second bead on the outer surface thereof adjacent to said base which engages said piston head circumferential groove to attach said diaphragm to said head.

2. The hydraulic brake defined in claim 1 wherein said rolling diaphragm is tapered.

3. The hydraulic brake defined in claim 1 wherein said first housing includes a discontinuity at one end thereof to force said first bead into said lug groove.

4. The hydraulic brake defined in claim 1 wherein said piston head circumferential groove is arcuate in cross-sectional shape and encompasses more than 180°.

5. The hydraulic brake defined in claim 4 wherein said second bead is arcuate in cross-sectional shape and encompasses more than 180°.

6. The hydraulic brake defined in claim 1, wherein said piston head circumferential groove encompasses approximately 315°.

7. The hydraulic brake defined in claim 6, wherein said second bead encompasses approximately 315°.

8. The hydraulic brake defined in claim 7, wherein said first bead has an arcuate surface which extends for approximately 180°.

9. The hydraulic brake defined in claim 8, wherein said second bead has an open section of approximately 40° to 45°.

10. The hydraulic brake defined in claim 1, wherein said first bead has an arcuate surface which extends for approximately 180°.

11. The hydraulic brake defined in claim 10, wherein said second bead has an open section of approximately 40° to 45°.

12. The hydraulic brake defined in claim 1, wherein said second bead has an open section of approximately 40° to 45°.

13. The hydraulic brake defined in claim 12, wherein said first bead has an arcuate surface which extends for approximately 180°.

14. The hydraulic brake defined in claim 13, wherein said piston head circumferential groove encompasses approximately 315°.

* * * * *